United States Patent [19]

Tanagawa

[11] Patent Number: 4,866,608
[45] Date of Patent: Sep. 12, 1989

[54] MICROPROCESSOR WITH IMPROVED EXECUTION OF INSTRUCTIONS

[75] Inventor: Kouji Tanagawa, Tokyo, Japan

[73] Assignee: Oki Electric Industry Co., Ltd., Tokyo, Japan

[21] Appl. No.: 926,539

[22] Filed: Nov. 4, 1986

[30] Foreign Application Priority Data

Nov. 5, 1985 [JP] Japan ............................ 60-247378

[51] Int. Cl.⁴ ........................................... G06F 9/30
[52] U.S. Cl. ............................... 364/200; 364/247.1; 364/261.2; 364/271.8
[58] Field of Search ............... 364/200, 900, 768, 300

[56] References Cited

U.S. PATENT DOCUMENTS

| 4,179,746 | 12/1979 | Tubbs | 364/900 |
| 4,245,327 | 1/1981 | Moriya et al. | 364/768 |
| 4,250,545 | 2/1981 | Blahut et al. | 364/200 |
| 4,272,828 | 6/1981 | Negi et al. | 364/900 |
| 4,449,196 | 5/1984 | Pritchard | 364/768 |
| 4,608,634 | 8/1986 | Caudel et al. | 364/200 |

Primary Examiner—Eddie P. Chan
Attorney, Agent, or Firm—Spencer & Frank

[57] ABSTRACT

In a computer, an address value is transferred to data pointer and a data is transfered from a memory location of a data memory being designated by the address value in the data pointer to a temporary register, the transfer of the address value and the transfer of the data being conducted within a first instruction cycle. In a second instruction cycle immediately following the first instruction cycle, an operation is performed by an ALU on data in an accumulater and the temporary register, and the result of operation is transferred to the accumulator and to the memory location of the data memory being designated by the data pointer.

12 Claims, 6 Drawing Sheets

| INSTRUCTION | FUNCTION |
|---|---|
| LD  R1 | TR ← (DP←R1) |
| ADD | (DP),A←TR+A |

FIG.6B

| INSTRUCTION | FUNCTION |
|---|---|
| ADD R1 | A ← A+(DP←R1) |
| ST  R1 | A → (DP←R1) |

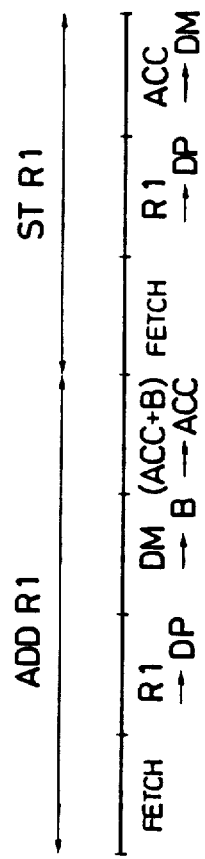
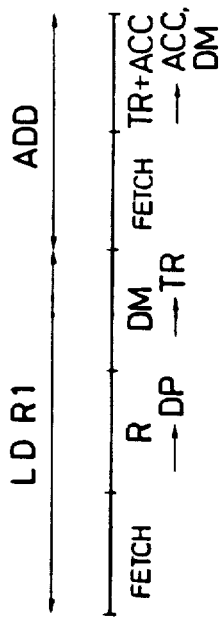
FIG. 7A PRIOR ART
FIG. 7B

MICROPROCESSOR WITH IMPROVED EXECUTION OF INSTRUCTIONS

BACKGROUND OF THE INVENTION

The present invention relates to a microcomputer, particularly a single-chip microcomputer.

Microcomputers generally comprise a CPU (central processing unit) comprising a control unit, an ALU (arithmetic logic unit), registers and the like, a memory device comprising a program memory in the form of a ROM (read-only memory) and/or a PROM (programmable ROM) and a data memory in the form of a RAM (random-access memory), and an I/O (input/output) device. In a single-chip microcomputer, all of the CPU, the memory device and the I/O device are built in a single IC (integrated circuit) chip. Such single-chip microcomputers are now widely used for control of various consumer goods and other devices.

With the recent development in the LSI (large scale integration) technology, the hardware of the microcomputer and the built-in peripheral equipment are getting more and more advanced. In line with this, it is now required that the organization of the instructions, or instruction set, be more advanced so that the functions of the microcomputer are fully utilized and programming by high-level languages via compilers is possible. For an instruction set to be recognized as an advanced instruction set, it is required to satisfy the following conditions:

(1) The instruction set should have sufficient instructions necessary for allowing various applications and compiling of the instructions.

(2) The instruction set should have a high addressing ability (designation of data by means of instruction). In other words, it should have a large number of addressing modes defining where the data (operand) should be brought from, and where the data should be stored, at the time of the execution of the instruction.

(3) Each of the instructions having various addressing modes of the instruction set should have an even addressing ability.

These conditions (1) through (3) can be satisfied if the number of the basic instructions can be increased. However, the number of instructions has a limit.

This will be explained in further detail in connection with a situation where each word consists of 8 bits.

Where each word consists of 8 bits, there are 256 ($=2^8$) instruction code spaces.

Figure 1:
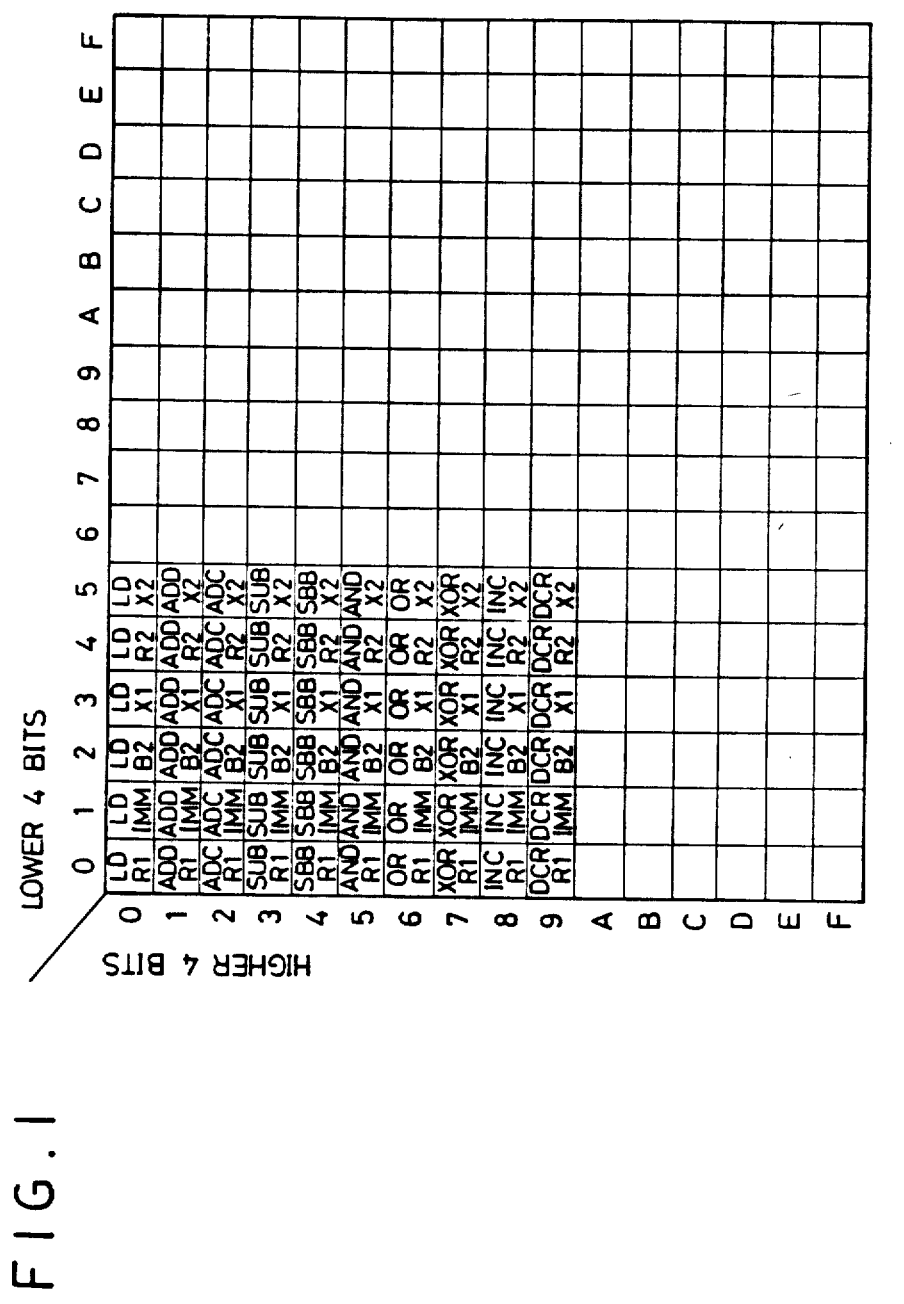

FIG. 1 schematically shows instruction code spaces in a matrix form. It is assumed that ten types of instructions including "load" (LD, in mnemonics) and "add" (ADD), "add with carry" (ADC) have six addressing modes. Accordingly, 60 instruction code spaces are required. Thus, it will be seen that as the number of addressing modes is increased, and as the number of types of instructions (the "types of instructions" are sometimes called "instructions" in this specification) having various addressing modes is increased, the number of instructions (in the sense of "types of instructions") to which the instruction code spaces can be allotted is decreased. Generally, the number of instructions in an 8-bit microcomputer having 4 to 7 addressing modes is about 100 to 120.

A method for increasing the number of instruction is shown in the "Z80 handbook" at page 58, published by CQ Publishing Co., Japan, on Jan. 10, 1985.

FIG. 2 shows a set of instruction codes illustrating this method.

In this method a specific code ($=DD$) of a first byte (8 bits) of an instruction is defined to mean that the next byte (second byte) is the real instruction code, and then the instruction codes of the second byte indicate instructions which are different from what the same instruction codes would have meant in the first byte. That is, the same instruction code is allotted to different instructions depending on whether it is in the first byte or in the second byte. With this method, the number of instructions is increased to 168, for example.

The above-described method has the disadvantage that the first byte does not convey any real instruction, and is used merely as a means for increasing the number of the instructions. As a result, the number of bytes constituting the instructions is increased and the efficiency of instruction (actual instructions per byte) is lowered and the time required for executing instructions is increased.

SUMMARY OF THE INVENTION

An object of the invention is to increase the number of instructions (types of instructions) without lowering the efficiency of instruction and without increasing the time for executing instructions.

According one aspect of the invention, there is provided a computer comprising a program memory storing instructions, a data memory storing data, an ALU performing arithmetic, logic and related operations, an accumulator storing one of the operands on which the ALU performs operations, a temporary register, a data pointer storing an address value designating a memory location of the data memory, and a set of general purpose registers, said computer further comprising a first means for transferring an address value of a memory location of the data memory to the data pointer, and for transferring the data in the memory location designated by the data pointer to the temporary register, the transfer of the address value and the transfer of the data being conducted in a first instruction cycle, and a second means for causing the ALU to perform an operation on the data in the accumulator and the data in the temporary register, and transferring the result of the operation to the accumulator and to the memory location of the data memory being designated by the data pointer, the operation by the ALU and the transfer of the result of the operation being conducted in a second instruction cycle immediately following the first instruction cycle.

According to another aspect of the invention, there is provided a method of controlling a computer comprising the steps of:

transferring an address value to a data pointer and transferring a data from a memory location of a data memory being designated by the address value in the data pointer to a temporary register, the transfer of the address value and the transfer of the data being conducted within a first instruction cycle, and performing, by means of an ALU, an operation on a data in an accumulator and the temporary register and transferring the result of the operation to the accumulator and to the memory location of the data memory being designated by the data pointer, the operation by the ALU and the transfer of the result of the operation being conducted within a second instruction cycle immediately following the first instruction cycle.

According to a further aspect of the invention, there is provided a method of controlling a computer characterized by the use of a program comprising, in part, a first instruction instructing transfer of an address value of a memory location of a data memory to a data pointer, and transfer of data in the memory location of the data memory being designated by the address value in the data pointer, and a second instruction immediately following the first instruction and instructing an ALU to perform an operation on the data in an accumulator and the data in the temporary register and transfer of the result of the operation to the accumulator and the memory location of the data memory being designated by the address value in the data pointer.

BRIEF DESCRIPTION OF THE DRAWINGS

In the accompanying drawings;

FIG. 1 is a diagram showing allotment of instruction code spaces in a conventional system;

FIGS. 6A and 6B show operations, particularly data flow, of the respective instructions; and FIGS. 7A and 7B are time charts showing operations conducted during the respective instruction cycles.

DETAILED DESCRIPTION OF THE PREFERRED EMBODIMENTS

Figure 3:
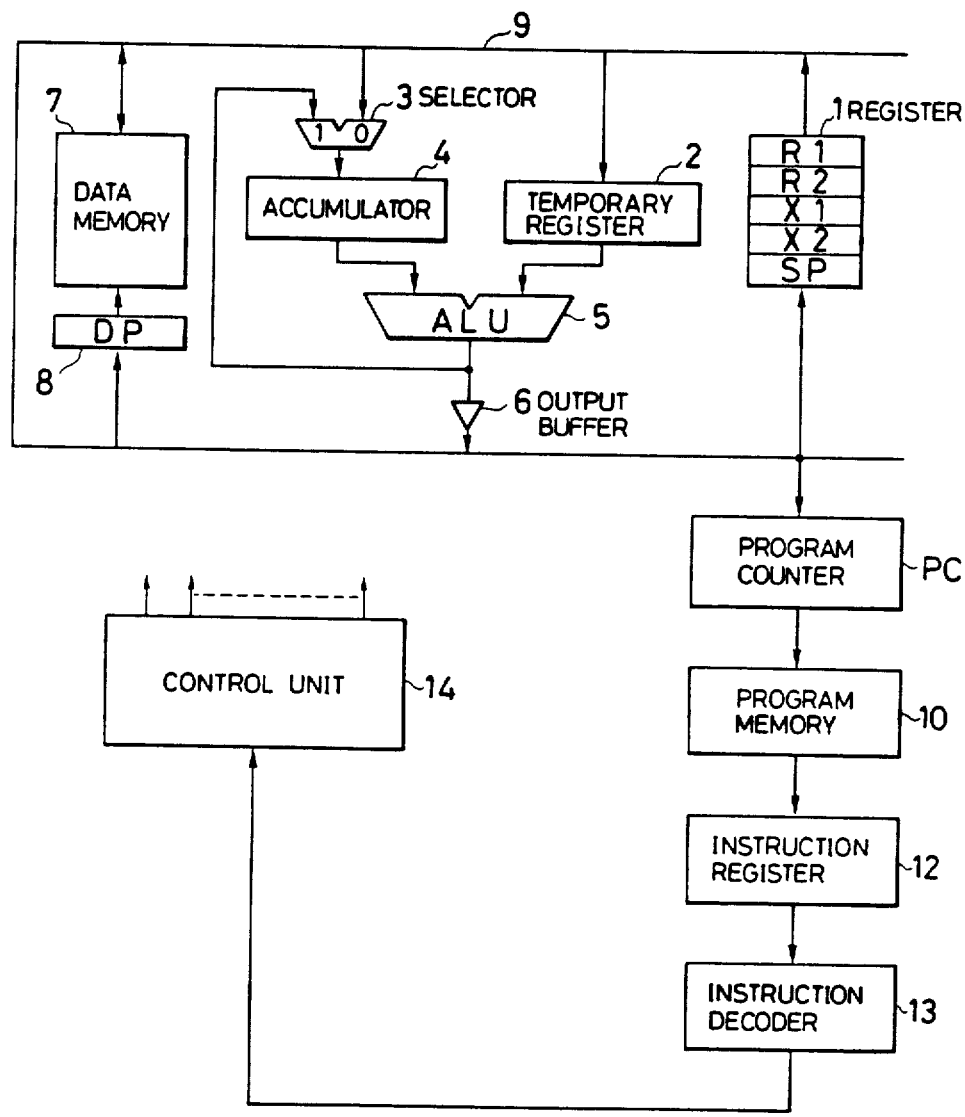
FIG. 3 is a block diagram showing various circuit components of a computer.

The microcomputer illustrated in FIG. 3 comprises a CPU (central processing unit) comprising internal registers 1, a temporary register 2, a selector 3, an accumulator 4, an ALU (arithmetic logic unit 5) and an output buffer 6. The microcomputer also comprises a memory device comprising a data memory 7 and a data pointer 8, and a program memory 10. The microcomputer further comprises an instruction register 12, an instruction decoder 13, and a control unit 14.

The CPU and the memory device are connected by an internal data bus 9.

The internal registers 1 includes general purpose registers R1, R2, index registers X1, X2, a stack pointer SP and a program counter PC. The stack pointer SP indicates a stack address in the data memory 7.

The temporary register 2 stores temporarily an operand, i.e., data from a data source, for example, the data memory 7, in accordance with a first instruction and then transmits the stored data to the ALU 5 in accordance with the following instruction. The input of the temporary register 2 is connected to the data bus 9 and the output of the temporary register 2 is connected to one input of the ALU 5.

The input of the selector 3 is connected to the data bus 9 and the output of the ALU 5. The selector 3 selects either the data from the data bus 9 or the result of operation from the ALU 5, and supplies the selected data to the accumulator 4.

The accumulator 4 stores an operand, i.e., data on which an operation by the ALU 5 is performed, and its output is connected to another input of the ALU 5.

The ALU 5 performs arithmetic, logic and related operations, such as addition and substraction on the data from the accumulator 4 and the temporary register 2, and its output is connected through the output buffer 6 to the data bus 9.

The data memory 7 is formed of a RAM (random access memory) and its data input/output terminals are connected to the data bus 9. The address of the data memory 7 is designated by the data pointer 8, whose input is connected to the data bus 9 and whose output is connected to the address input of the data memory 7.

Figure 2:
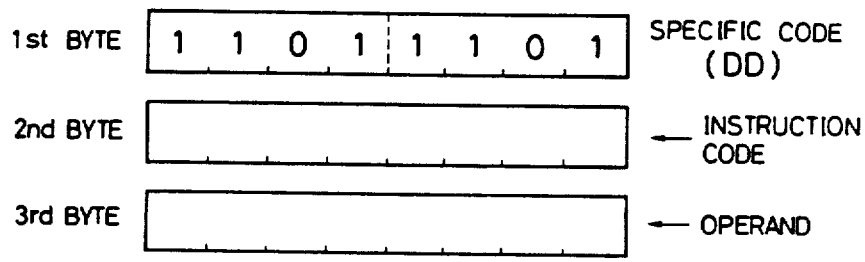
FIG. 2 shows instruction codes used for expanding the instruction code spaces according to the prior art.
Figure 4A:
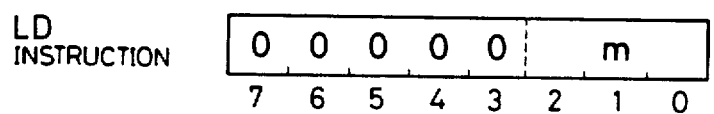
FIGS. 4A and 4B show instruction codes corresponding to instructions.
Figure 4B:
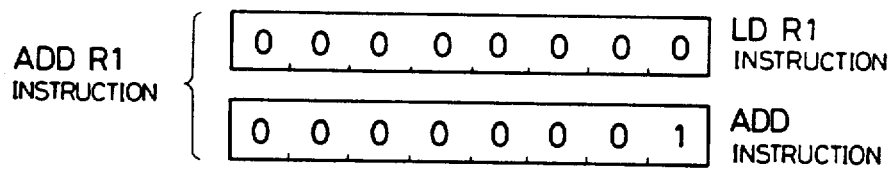

An example of the organization of instructions as stored in the program memory 10 according to the invention is shown in FIGS. 4A and 4B.

The invention is featured by a combination of a first instruction for transferring an address value to the data pointer 8 and for transferring data from the memory location of the data memory 7 designated by the address value in the data pointer 8 to a temporary register, e.g., the temporary register 2, and a second instruction for performing an operation on the data in the accumulator 4 and the temporary register 2 and transferring the result of the operation to the accumulator 4 and to the above-mentioned memory location still being designated by the address value in the data pointer 8. In other words, according to the invention, and address value is transferred to the data pointer 8 and data in the memory location of the data memory 7 designated by the data pointer 8 is transferred to the temporary register 2, during a first instruction cycle, and during a second instruction cycle, immediately following the first instruction cycle, an operation is performed by the ALU 5 on the data in the accumulator 4 and the data in the temporary register 2 and the result of the operation is transferred to the accumulator 4 and to the memory location of the data memory 7 designated by the data pointer 8.

For instance, the first instruction for transferring the address value to the data pointer 8 and transferring the data to the temporary register 2 may be a "load" instruction. Examples of the second instructions for performing an operation and transferring the result of the operation to the data memory are ADD (addition), ADC (addition with carry), SUB (subtraction), SBB (subtraction with borrow), AND (logical product), OR (logical sum), XOR (exclusive logical sum), INC (increment) and DCR (decrement).

The load instructions have several addressing modes and are expressed by "LDm". The code m consists of 3 bits designates one of the addressing modes. The number of the addressing modes is 6 in the illustrated example. The values of the code m respectively represent the following addressing modes and have the following significances or functions.

m=0
addressing mode: R1, register
significance: The contents in the general purpose register R1 indicate the address of the data memory.

m=1
addressing mode: IMM, immediate
significance: The second byte, i.e., the byte immediately following the LD instruction, is the data.

m=2
addressing mode: B2, direct
significance: The second byte, i.e., the byte immediately following the LD instruction, designates the address of the data memory.

m=3
addressing mode: X1, index significance: The sum of the contents in the index register X1 and the contents in the second byte designates the address of the data memory.

m=4 addressing mode: R2, register significance: The contents in the general purpose register R2 designates the address of the data memory.

m=5 addressing mode: X2, index significance: The sum of the contents in the index register X2 and the contents in the second byte designates the address of the data memory.

Thus, it will be seen that when the code m is either 0, 2, 3, 4 or 5, the address of data memory is determined and supplied to the data pointer 8, which thereby designates the memory location from which the data should be transferred to the temporary register 2. When the code m is 1 the data in the second byte is transferred to the temporary register 2.

The code m consisting of 3 bits occupies the lower 3 bits of an 8-bit instruction code, while the higher 5 bits have the value "00000" indicate the operation "load" or LD. Thus, the instruction code spaces of 00 through 05 (in hexadecimal notation) are occupied by "LD5", as illustrated in FIG. 5.

Figure 5:
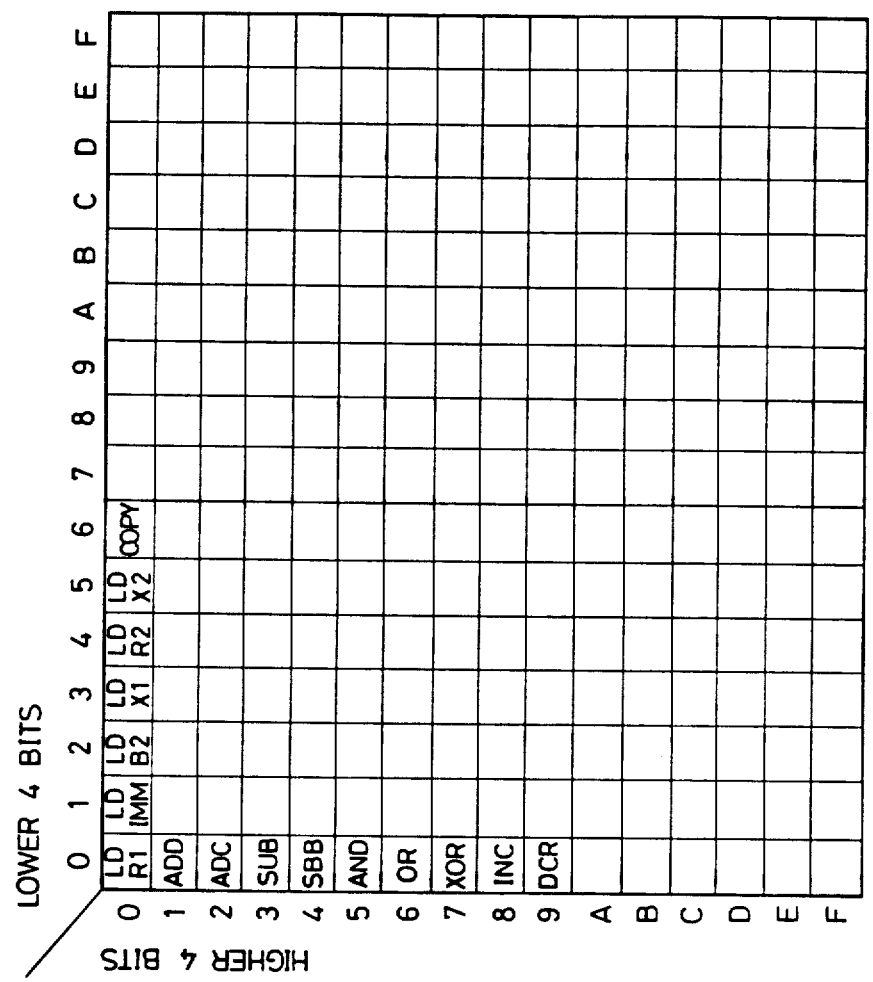
FIG. 5 is a diagram showing allotment of instruction code spaces according to the invention.

In the diagram of FIG. 5, the instruction code spaces for the codes 00 through 05 are allotted to LDR1, LDIMM, LDB2, LDX1, LDR2 and LDX2, respectively. The addressing modes R1, IMM, B2, X1, R2 and X2 are represented by m=0, m=1, m=2, m=3, m=4 and m=5, respectively. In other words, the code m may be considered to represent R1, IMM, B2, X1, R2 or X2 when M=0, 1, 2, 3, 4 or 5.

For instance, for "LDR1", the contents of the general purpose register R1 are transferred through the data bus 9, to the data pointer 8, by which the address of the data memory 7 is designated. The contents in the memory location of the data memory 7 designated by the data pointer 8 are read out and loaded in the temporary register 2. This function, particularly the data flow, is shown in FIG. 6A.

According to the invention, an "LD" instruction such as "LDR1" is used in combination with one of the instructions for an arithmetic, logic and related operation, which does not have addressing, i.e., which is a zero-address instruction, as will be later described more fully.

These instructions instruct the ALU 5 to perform the operations on the contents in the accumulator 4 and the temporary register 2, and the result of the operation is transferred through the output buffer 6 to the accumulator 4 and to the memory location of the data memory 7 designated by the data pointer 8 (that is, the memory location from which the data was extracted for the operation during the preceding instruction cycle).

In the prior art system, these instructions have several addressing modes and occupy several instruction code spaces. According to the invention, these operation instructions do not have any addressing, so that only one space is allotted to each instruction. In the example of the diagram of FIG. 5, the instruction code spaces 10, 20, 30, 40, 50, 60, 70, 80 and 90 (in hexadecimal notation) are allotted to ADD, ADC, SUB, SBB, AND, OR, XDR, INC and DCR.

For the purpose of illustration, a combination of "LD R1" instruction and "ADD" instruction is shown in FIG. 4B.

The functions of the combination of the instructions are schematically illustrated in FIG. 6A. As will be seen, the "LD R1" instruction causes the contents in the general purpose register R1 to be loaded in the data pointer 8 and the contents of the memory location of the data memory 7 designated by the data pointer 8 to be transferred to the temporary register 2. The "ADD" instruction causes the addition of the contents in the accumulator 4 and the temporary register 2 and transfer of the result of the addition to the accumulator 4 and to the memory location of the data memory 7 designated by the data pointer 8.

For the purpose of comparison, a combination of instruction according to the prior art system corresponding to the instructions shown in FIG. 4B and FIG. 6A is shown in FIG. 6B, together with its functions. The "ADD R1" instruction causes loading of the contents in the general purpose register R1 into the data pointer 8 and addition of the contents in the memory location of the data memory 7 designated by the data pointer 8 and the contents in the accumulator 4, and the result of the addition being stored in the accumulator 4. The "ST R1" instruction causes the loading of the contents in the general purpose register R1 into the data pointer 8 and storing the contents of the accumulator 4 into the memory location of the data memory 7 designated by the data pointer 8.

As will be seen, with the prior art system, addressing of the same value (loading of the contents of the general purpose register R1 into the data pointer 8) is repeated. In contrast, according to the invention, this is done only once (only during the execution of the "LD" instruction). As a result, the time required for the completion of the combination of the instructions is shorter, according to the invention.

This will be more apparent from the time charts of FIGS. 7A and 7B, where the respective steps of the fetch (instruction fetch) and data flow (flow of address value: R1-DP, and flow of data (DM-ACC, etc)) are shown to be conducted during respective states, and the combination of the "LDR1" instruction and the "ADD" instruction according to the present invention required 5 states, whereas the combination of the "ADD R1" instruction and the "STR1" instruction of the prior art system requires 7 states.

The use of the temporary register 2 is not limited to transfer of data from the data memory 7. For instance, the data stored in the accumulator 4 can be transferred to the temporary register 2 by a COPY instruction. That is, when a COPY instruction is fetched out of the program memory 10, the data in the accumulator 4 is transferred to the temporary register 2 in the same instruction cycle.

This COPY instruction is followed by an instruction for performing an operation, such as INC (increment), on the data in the temporary register 2, and the result of the operation is loaded in the accumulator 4. These actions are again performed in the same instruction cycle as the fetching of the INC instruction.

The functions of the respective instructions can be described as follows:

COPY : ACC→TR

INC : TR+1→ACC

The net result is the increment of the data in the accumulator 4.

Other examples of operation which can be made following the transfer of the data from the accumulator 4 to the temporary register 2 by the COPY instruction are "decrement", "rotate" for rotating the bits of the data, and shift.

The instruction for transferring data to the temporary register 2 may be followed by more than one instruction for operating on the data in the temporary register 2. For instance, the following three instructions may be performed in sequence:

LD R1 : TR←(DP←R1)
AND : (DP), A←A ∧ TR
OR : (DP), A←A ∨ TR

Here, the "AND" instruction causes the logical product of the data in the accumulator 4 and the data in the temporary register 2 to be determined and then transferred to the accumulator 4 and to the memory location of the data memory 7 designated by the data pointer 8, within the same instruction cycle. The subsequent "OR" instruction causes the logical sum of the data in the accumulator 4, i.e., the result of the logical product operation during the previous instruction cycle, and the data in the temporary register 2 to be determined and then transferred to the accumulator 4 and to the memory location of the data memory 7 designated by the data pointer 8, within the same instruction cycle.

The advantages of the above-described embodiment are summarized as follows:

Where an operation, such as an addition or subtraction, is performed, the data is stored in the temporary register 2. This is also done in the prior art. According to the invention, this operation for loading the temporary register 2 is separated from the subsequent operation, and the instruction for loading the temporary register 2 has several addressing modes, so that the instructions for performing operations by the ALU 5 need not have addressing modes but simply have to perform operations on the data in the accumulator 4 and in the temporary register 2. It is therefore no longer necessary for the instructions for performing operations by the ALU 5 to have various addressing modes. The number of instruction code spaces allotted to the instructions for performing the required functions can be reduced.

For instance, assume that the prior art system requires six addressing modes for each of 10 types of instructions (including the load instruction). The prior art system requires 60 instruction code spaces. In contrast, according to the invention, although the LD instruction requires six addressing modes, the instructions for the operation following the LD instruction does not require any addressing mode. As a result, the total number of instruction code spaces if 6+9=15. Thus, the total number of the required instruction code spaces is reduced from 60 to 15. The instruction code spaces which are no longer required for the operations can be used for other purposes or instruction.

Moreover, the operation of transferring data to the data pointer is not duplicated, and the overall operating speed is increased.

The instruction set used according to the present invention have instructions suitable for various applications and compiling, and the number of addressing modes can be increased without occupying too many instruction code spaces.

What is claimed is:

1. A computer which includes an ALU means for performing arithmetic, logic and related operations, an accumulator means connected to the ALU means for storing one of the operands on which the ALU means performs operations, a temporary register connected to the ALU means, memory means for storing a program having instructions and for storing data at data memory locations having respective address values, the memory means including a data pointer means for storing an address value designating a data memory location, and a set of additional registers, said computer further comprising a first means for transferring an address value of a data memory location to the data pointer means, and for transferring the data in the data memory location designated by the data pointer means to the temporary register, the transfer of the address value and the transfer of the data being conducted in a first instruction cycle, and a second means for causing the ALU means to perform an operation on the data in the accumulator means and the data in the temporary register, and transferring the result of the operation to the accumulator means and to the data memory location designated by the data pointer means so that the result of the operation performed by the ALU means can be transferred to the same data memory location from which data was originally transferred, the operation by the ALU means and the transfer of the result of the operation being conducted in a second instruction cycle immediately following the first instruction cycle.

2. A computer according to claim 1, wherein the first means comprises means for reading the address value from one of the additional registers.

3. A computer according to claim 1, wherein the first means comprises means for calculating the address value from a value in one of the additional registers.

4. A computer according to claim 1, wherein the ALU means has an input port to which the temporary register is connected, the temporary register being connected to said input port of the ALU means in such a manner that any input to said input port of the ALU means must pass through the temporary register.

5. A computer according to claim 1, wherein the ALU means has a first input port connected to the accumulator means and a second input port connected to the temporary register.

6. A method for increasing the overall operating speed of computer while executing instructions, comprising the steps of:

transferring an address value to a data pointer and transferring a data from a memory location of a data memory being designated by the address value in the data pointer to a temporary register, the transfer of the address value and the transfer of the data being conducted within a first instruction cycle, and performing, by means of an ALU, an operation on a data in an accumulator and the data in the temporary register and transferring the result of the operation to the accumulator and to the memory location of the data memory being designated by the data pointer so that the result of the operation performed by the ALU can be transferred to the same data memory location from which data was originally transferred, the operation by the ALU and the transfer of the result of the operation being conducted within a second instruction cycle immediately following the first instruction cycle.

7. A method according to claim 6, wherein the address value in the data pointer is kept unchanged between the first and the second instruction cycles.

8. A method according to claim 6, wherein the step of transferring the address value comprises reading the address value from an additional register.

9. A method according to claim 6, wherein the step of transferring the address value comprises calculating the address value from a value in an additional register.

10. A method for increasing the overall operating speed of a computer while executing instructions, comprising the steps of:
(a) transferring an address value to a data pointer during a first instruction cycle, the address value designating a memory location in a data memory;
(b) during the first instruction cycle, transferring data in the memory location designated by the address value in the data pointer to a temporary register;
(c) during a second instruction cycle which immediately follows the first instruction cycle, using an ALU to perform an operation on the data in the temporary register and further data in an accumulator; and
(d) during the second instruction cycle, transferring the result of the operation performed by the ALU to the accumultor and to the memory location designated by the address value in the data pointer so that the result of the operation performed by the ALU can be transferred to the same data memory location from which data was originally transferred.

11. The method of claim 10, wherein step (a) comprises reading the address value out of a further register.

12. The method of claim 10, wherein step (a) comprises calculating the address value from a value stored in a further register.

* * * * *